US012563116B2

(12) United States Patent
Mokhtar et al.

(10) Patent No.: US 12,563,116 B2
(45) Date of Patent: Feb. 24, 2026

(54) TRUSTED LIGHTWEIGHT COMMUNICATION IN CLOUD ROBOTICS

(71) Applicant: Intel Corporation, Santa Clara, CA (US)

(72) Inventors: Amr Mokhtar, Limerick (IE); Hassnaa Moustafa, San Jose, CA (US); Ignacio J. Alvarez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 639 days.

(21) Appl. No.: 17/953,565

(22) Filed: Sep. 27, 2022

(65) Prior Publication Data

US 2023/0020169 A1     Jan. 19, 2023

(51) Int. Cl.
*H04L 67/12*          (2022.01)

(52) U.S. Cl.
CPC .................................... *H04L 67/12* (2013.01)

(58) Field of Classification Search
CPC .............................. H04L 67/12; H04L 67/104
See application file for complete search history.

(56) References Cited

U.S. PATENT DOCUMENTS

| | | | |
|---|---|---|---|
| 12,026,780 B1 * | 7/2024 | Bryant | G06Q 20/389 |
| 2019/0164220 A1 * | 5/2019 | Raj | G06Q 40/04 |
| 2021/0304218 A1 * | 9/2021 | Bahrami | H04L 63/08 |
| 2022/0198562 A1 * | 6/2022 | Cella | G06Q 40/04 |
| 2023/0043223 A1 * | 2/2023 | Jakobsson | G06F 21/44 |

* cited by examiner

*Primary Examiner* — El Hadji M Sall
(74) *Attorney, Agent, or Firm* — Schwegman Lundberg & Woessner, P.A.

(57) ABSTRACT

System and techniques for trusted lightweight communication in cloud robotics are described herein. A device for trusted lightweight communication in cloud robotics can include a memory having instructions and processing circuitry. When in operation, the processing circuitry can be configured by the instructions to receive a first report from a first device after the first device runs a first algorithm and a second report from a second device after the second device runs the first algorithm with an edge controller. The first algorithm can be stored on a distributed ledger. Consensus between the first device and the second device can be determined by agreement between the first report and the second report. An entry, indicative of consensus between the first device and the second device, can be added to the distributed ledger.

21 Claims, 4 Drawing Sheets

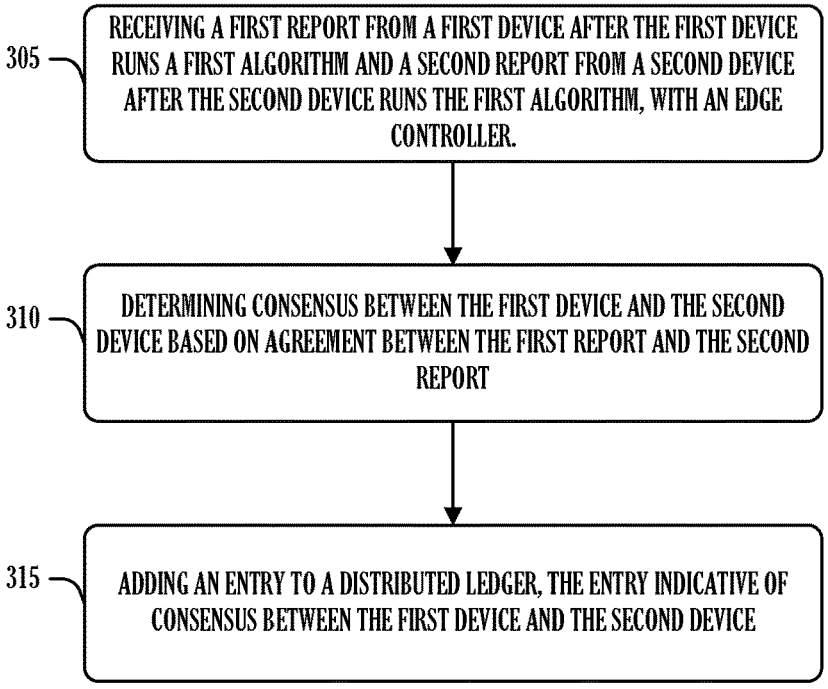

305 — RECEIVING A FIRST REPORT FROM A FIRST DEVICE AFTER THE FIRST DEVICE RUNS A FIRST ALGORITHM AND A SECOND REPORT FROM A SECOND DEVICE AFTER THE SECOND DEVICE RUNS THE FIRST ALGORITHM, WITH AN EDGE CONTROLLER.

310 — DETERMINING CONSENSUS BETWEEN THE FIRST DEVICE AND THE SECOND DEVICE BASED ON AGREEMENT BETWEEN THE FIRST REPORT AND THE SECOND REPORT

315 — ADDING AN ENTRY TO A DISTRIBUTED LEDGER, THE ENTRY INDICATIVE OF CONSENSUS BETWEEN THE FIRST DEVICE AND THE SECOND DEVICE

FIG. 3

TRUSTED LIGHTWEIGHT COMMUNICATION IN CLOUD ROBOTICS

TECHNICAL FIELD

Embodiments described herein generally relate to communication between cloud robots and, more specifically, to trusted lightweight communication in cloud robotics.

BACKGROUND

Cloud robots can interact and collaborate in a distributed zero-trust setting. Sometimes, cloud robots can operate in a harsh environment that requires a framework for secure and trust-proof communications. Trusted and secure communications can demand elevated processing power and low latency assurance. Blockchain has been utilized as a distributed database but not as a decision-making framework for time-sensitive use cases such as autonomous driving, cloud robotics decision-making, and many other similar use cases.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 3 illustrates a flow diagram of an example of a method for trusted lightweight communication in cloud robotics, according to an embodiment.

DETAILED DESCRIPTION

Figure 1:
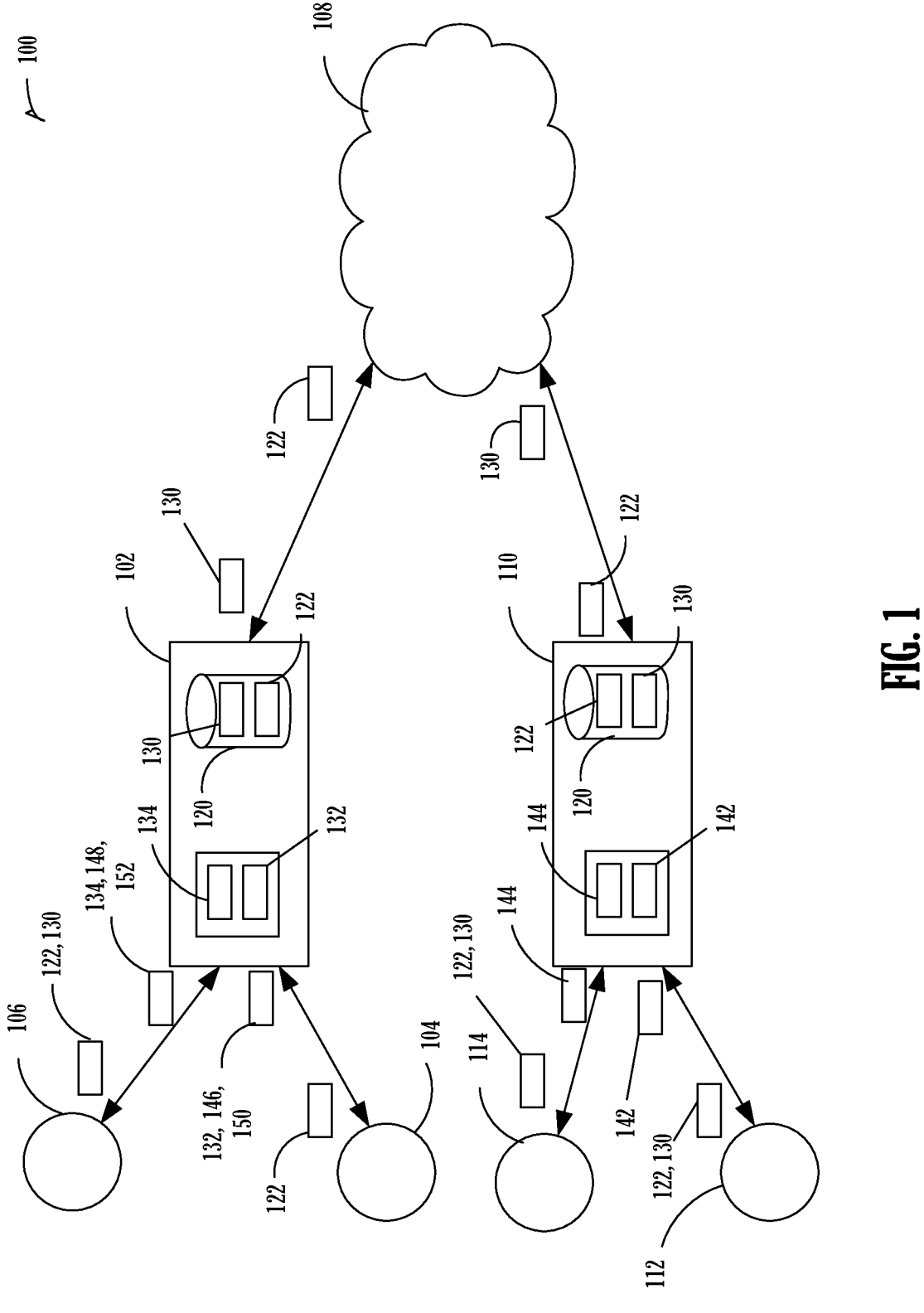
FIG. 1 is a block diagram of an example of an environment including a system for trusted lightweight communication in cloud robotics, according to an embodiment.

Cloud robotics is an emerging domain concerned with creating a network of automated systems (robots) where processing, storage, and tasks can be done collaboratively. Cloud robotics is motivated by the constrained processing power and memory bandwidth of individual robots and the need to offer low-cost autonomous mobile robots. One solution to constrained processing power and memory bandwidth can be offloading the computation from low-capability robots to nodes with improved processing capabilities. The improved processing capabilities of the nodes can be mobile robots or fixed edge nodes. The improved processing capabilities improve computing performance and storage within a network of cloud robots. The pervasiveness and distributed nature of cloud robotics necessitate the need for security and trust.

Decision-making and planning can be components of autonomy in cloud robotics. Decision-making can include path and motion planning, coverage and task planning, or taking actions that help robots understand the surrounding world. Communication and collaboration between the cloud robots can contribute during the decision-making to fulfill applications such as factories, warehouses, hospitality, and smart cities; connected vehicles, augmented reality or virtual reality users and media content consumers; rescue missions; mining and agriculture; espionage purposes; underwater discoveries; tactical coordinated deployments; logistics and hiring services; healthcare, or the like.

Blockchain is a system of recording information that makes it difficult or impossible to change or cheat the system. A blockchain is essentially a digital ledger of transactions between a decentralized network of peers. Blockchain does not only secure these transactions, but it ensures trust between peers who do not necessarily trust each other.

Blockchain forms a list of back-linked blocks—each block stores a hash calculated from the contents of the previous block. Each block can contain several transactions. Therefore, any minor change in the contents of a block can drastically alter the hash value—effectively invalidating the block, and thereby the blockchain becomes broken.

The trust comes from the chain of blocks being publicly visible and verifiable by all devices connected to the network. Thus, all the peers are in-sync on the state of the blockchain because they can confirm that the hash field in every block matches the calculation of the previous block. This confirmation of the hash field can be called consensus.

Bitcoin, and other blockchain cryptocurrencies, facilitated currency transaction recording in data blocks that could be perceived as a decentralized database. The decentralized database can be called distributed ledger technology (DLT). Other cryptocurrencies, such as Ethereum, launched a blockchain based on smart contracts. Smart contracts are programs stored on the DLT that run when predetermined conditions are met. Smart contracts can be used to automate the execution of an agreement so that all participants can be immediately certain of the outcome. Thus, smart contracts can automate a workflow, triggering the next action when conditions are met.

This disclosure introduces a trusted lightweight framework for time-sensitive task coordination and decision-making for a community of networked robots that reaches a consensus at low latency using smart contracts backed by blockchain. Smart contracts can hold a decision-making algorithm that can be triggered by transactions and produces a predictable result that is agreed upon by all parties, i.e.: consensus.

In an example, when a robot first connects to the network, it can receive a copy of the smart contract that is stored on the blockchain. The blockchain, and the smart contract, can be replicated in all the other connected robots. The smart contract can hold an algorithm, e.g., a path planning algorithm. When the robots intend to collaborate with their peers, they can exercise a transaction (with the new path plan data) that can trigger the path planning algorithm stored on the smart contract. The execution of the smart contract takes place in the onboard CPU of every robot. Thus, the execution of smart contracts can be lightweight and has low latency. Once all the robots finish the smart contract execution, they can communicate the outcome and reach consensus. For example, consensus can be reached using Practical Byzantine Fault Tolerance (PBFT), any other consensus technique, or the like.

When consensus is reached, the transaction (or transactions) and their outcomes from the smart contract execution are stored into a block and entered onto the DLT of the blockchain and shortly replicated to all the peers. With that, the robotic peers canabide by operations they obtained consensus on, and collectively succeed in their path planning.

In examples, an edge cloud can be built by a group of high-performance Intel® platforms that provision all the essential computing and storage to execute the smart contracts and store the blockchain data at scale and low latency. Intel® platforms in the edge cloud leveraging Intel® Software Guard Extensions (SGX) to facilitate a Trusted Execution Environment (TEE) for execution of smart contracts and Intel® Blockscale Application Specific Integrated Circuit (ASIC) for accelerated execution of the blockchain consensus.

The above discussion is intended to provide an overview of the subject matter of the present patent application. It is not intended to provide an exclusive or exhaustive explanation of the invention. The description below provides further information about the present patent application.

FIG. 1 is a block diagram of an example of an environment including a system 100 for trusted lightweight communication in cloud robotics, according to an embodiment. The system 100 can include a first edge controller 102 and a second edge controller 110. The first edge controller 102 and the second edge controller 110 are wirelessly connected to one another via a first cloud server 108. The first edge controller 102 can be connected to a first edge device 104, and a second edge device 106. The second edge controller 110 is connected to a third edge device 112 and a fourth edge device 114. A first distributed ledger 120 can be shared between the first edge controller 102 and the second edge controller 110 via the first cloud server 108.

The first edge controller 102 can receive a first report 132 from the first edge device 104 after the first edge device 104 runs a first algorithm 122. The first edge device 104 can receive the first algorithm 122 from the first edge controller 102 via a smart contract stored on the first distributed ledger 120. To initiate the first edge device 104 to run the first algorithm 122, the first edge controller 102 can transmit a request for the first edge device 104 to run the first algorithm 122.

The first edge controller 102 can also receive a second report 134 from the second edge device 106 after the second edge device 106 runs the first algorithm 122. In examples, the second report 134 can be stored on the distributed ledger 120. For example, the first algorithm 122 can be stored on a smart contract on the distributed ledger 120. To initiate the second edge device 106 to run the first algorithm 122, the first edge controller 102 can transmit a request for the second edge device 106 to run the first algorithm 122.

The first edge controller 102 can receive a request to join a network from the third edge device 112. The first edge device 104 and the second edge device 106 can be connected to the network. For example, the request to join the network from the third edge device 112 can be sent to the first edge controller 102 via the first cloud server 108. Upon granting connection to the third edge device 112, the first edge controller 102 can transmit a copy of the distributed ledger first distributed ledger 120 to the third edge device 112. The first edge controller 102 can also transmit a transaction notifying the third edge device 112 of the first algorithm 122 stored on the distributed ledger 120 to the third edge device 112 upon the third edge device 112 connecting to the network. In examples, the first edge controller 102 can also transmit instructions to the third edge device 112 to run the first algorithm 122.

In an example, the first edge controller 102 can receive a third report 142 from the third edge device 112 after the third edge device 112 runs the first algorithm 122. The controller 102 can also determine consensus between the first edge device 104, the second edge device 106, and third edge device 112 on agreement between the first report 132, the second report 134, and the third report 142. Here, the first edge controller 102 can add a second entry to the distributed ledger 120. The second entry can be indicative of consensus between the first edge device 104, the second edge device 106, and the third edge device 112. Thus, upon adding the second entry on the distributed ledger 120, the distributed ledger 120 can include the first entry and the second entry. The distributed ledger 120 can also include any previously added smart contracts, algorithms, software packages, transactions between any of the devices with access to the distributed ledger, or the like.

The first edge controller 102 can receive a request to join a network from the fourth edge device 114. For example, the request to join the network from the fourth edge device 114 can be sent to the first edge controller 102 via the first cloud server 108. Upon granting connection to the fourth edge device 114, the first edge controller 102 can transmit a copy of the distributed ledger first distributed ledger 120 to the fourth edge device 114. The first edge controller 102 can also transmit a transaction notifying the fourth edge device 114 of the first algorithm 122 stored on the distributed ledger 120 to fourth edge device 114 upon the fourth edge device 114 connecting to the network. In examples, the first edge controller 102 can also transmit instructions to the fourth edge device 114 to run the first algorithm 122.

In an example, the first edge controller 102 can receive a fourth report 144 from the fourth edge device 114 after the fourth edge device 114 runs the first algorithm 122. The controller 102 can also determine consensus between the first edge device 104, the second edge device 106, and third edge device 112, and the fourth edge device 114 on agreement between the first report 132, the second report 134, the third report 142, and the fourth report 144. Here, the first edge controller 102 can add a third entry to the distributed ledger 120. The third entry can be indicative of consensus between the first edge device 104, the second edge device 106, the third edge device 112, and the fourth edge device 114. Thus, upon adding the third entry on the distributed ledger 120, the distributed ledger 120 can include the first entry, the second entry, and the third entry. The distributed ledger 120 can also include any previously added smart contracts, algorithms, software packages, transactions between any of the devices with access to the distributed ledger, or the like.

In response to the third edge device 112 and the fourth edge device 114 running the first algorithm 122, the second edge controller 110 can receive a third report 142 and a fourth report 144 from the third edge device 112 and the fourth edge device 114, respectively. In examples, the third report 142 and the fourth report 144 can be shared to the first edge controller 102 via the first cloud server 108. Moreover, if the first edge controller 102 and the second edge controller 110 reach consensus, the third report 142 and the fourth report 144 can be added to the first distributed ledger 120.

In an example, the first distributed ledger 120 can also include a second algorithm 130. The second algorithm 130 can be stored on the first distributed ledger 120. In examples, the second algorithm 130 can be a variation of the same operations achieved by the first algorithm 122. In another example, the second algorithm 130 can complete completely different operations than the first algorithm 122.

In an example, edge devices (e.g., the first edge device 104, the second edge device 106, the third edge device 112, or the fourth edge device 114) can be autonomous vehicles. For example, the edge devices can be a consumer vehicle, a commercial vehicle, or a robotic system used to transport goods around a region. In examples, the algorithms (e.g., the first algorithm 122 or the second algorithm 130) can be a path planning algorithm to determine a best route between a first point and a second point. For example, the algorithms can be a path planning algorithm to determine a best route to travel from a first geographic location to a second geographic location. Here, the algorithms can take a lot of external factors (e.g., weather, traffic, road construction, road closures, traffic signals, events, or the like) to determine a best path between the first geographic location and the second geographic location. In examples, the first edge device 104 can be a first model of an autonomous vehicle, and the second edge device 106 can be a different model of an autonomous vehicle.

In examples, the edge devices can be manufacturing robots. For example, the edge devices can be a welder, coater, sealer, assembler, or the like. Here, the edge devices can be completing the same task, or the edge devices can be completing complementary tasks. In yet another example, edge devices can be completing tasks completely unrelated to one another. In examples, the algorithms (e.g., the first algorithm 122 or the second algorithm 130) can be a sequence planning algorithm to determine the best sequence to complete a task. For example, the sequence planning algorithm can verify the path of the edge devices during the lifecycle of the operations to determine that there is no interference between the operations being carried out by the first edge device 104 and the operations being carried out by the second edge device 106. For example, the edge devices can avoid collision by running the sequence planning algorithm after consensus.

For example, the edge devices and the edge controllers (e.g., the first edge controller 102 and the second edge controller 110) can reach consensus between the first device and the second device. In examples, consensus can be based on agreement between the first report 132 and the second report 134. Agreement between the first report 132 and the second report 134 can come in different forms. For example, agreement can be verification that operations of the first edge device 104 will not interfere with operations of the second edge device 106. In another example, agreement can be verification that the first edge device 104 and the second edge device 106 determine a path is the most efficient path between a first geographic location and a second geographic location. In yet another example, agreement can be that the first edge device 104 and the second edge device 106 detect the same hazards, or warnings, while running the first algorithm. Thus, agreement can be specific to the algorithm, but the examples provided above are not intended to be limiting as the algorithms suggested can be for multiple problems interfaced by autonomous mobile robots. For example, consensus can be made when a hash on a new entry matches the hash of the distributed ledger.

In an example, the first edge controller 102 or the second edge controller 110 can add a fourth entry to the distributed ledger 120. The entry can be indicative of consensus between the first edge device 104 and the second edge device 106. In another example, the entry can be indicative of consensus between the first edge device 104, the second edge device 106, the third edge device 112, and the fourth edge device 114. Here, an entry can be made on the distributed ledger 120 upon consensus of all devices or controllers and verification of a hash on the distributed ledger 120 to verify that no modifications or alterations were made to the distributed ledger 120. The entry adds the consensus to the distributed ledger 120 so all devices can reference the ledger and know that consensus was reached between the devices.

The controllers (e.g., the first edge controller 102 or the second edge controller 110) can receive a smart contract entry for the distributed ledger 120 from the cloud server 108. For example, the smart contract entry can be the second algorithm 130. The first edge controller 102 can transmit a transaction to the first edge device 104 and the second edge device 106 to run the second algorithm 130. The controller 102 can receive a fifth report 146 from the first edge device 104 after the first edge device 104 runs the second algorithm 130 and a sixth report 148 from second edge device 106 after the second edge device 106 runs the second algorithm 130.

The controllers can determine consensus between the first edge device 104 and the second edge device 106 on agreement between the fifth report 146 and the sixth report 148. The controllers can add a fifth entry to the distributed ledger, the fifth entry can be indicative of consensus between the first edge device 104 and the second edge device 106. The fifth entry can also be indicative of consensus between any combination of the first edge device 104, the second edge device 106, the third edge device 112, or the fourth edge device 114. As discussed above, the distributed ledger 120 can also include any previously added smart contracts, algorithms, software packages, transactions between any of the devices with access to the distributed ledger, or the like.

In an example, the controllers can also receive a seventh report 150 from the first edge device 104 after the first edge device 104 runs the first algorithm 122 and an eighth report 152 from the second edge device 106 after the second edge device 106 runs the first algorithm 122. In examples, the controllers can determine no consensus between the first edge device 104 and the second edge device 106 based on disagreement between the seventh report 150 report and the eighth report 152. For examples, the disagreement can include a potential collision between the first edge device 104 and the second edge device 106, a mismatch in the warnings or errors while running the algorithms, a different calculated best path between a first location and a second location, or the like. In yet another example, the mismatch can be a discrepancy in hashes between the seventh report 150 and the eighth report 152. The discrepancy in hashes between the seventh report 150 and the eighth report 152 can be indicative of a breach in the integrity of the data in the seventh report 150 or the eighth report 152. Thus, the controllers can determine not to add an entry to the distributed ledger 120 because there was no consensus between the first edge device 104 and the second edge device 106.

As shown in FIG. 1, every group of cloud robots can transact through smart contracts and store the distributed ledger locally. The transfer of entries, smart contracts, and updates to the distributed ledger can be low latency because of the close geographic locations of each of devices within the system 100. Moreover, edge controllers prevent the need to transfer data directly from the edge devices and the cloud server. The reduction of the "consensus latency" enables the edge devices to transact securely through a blockchain in real time. In parallel, the edge controller can constantly synchronize the distributed ledger of the blockchain with the centralized cloud server so that the rest of the edge controllers can be in-sync with all the transactions taking place in the distributed network.

Figure 2:
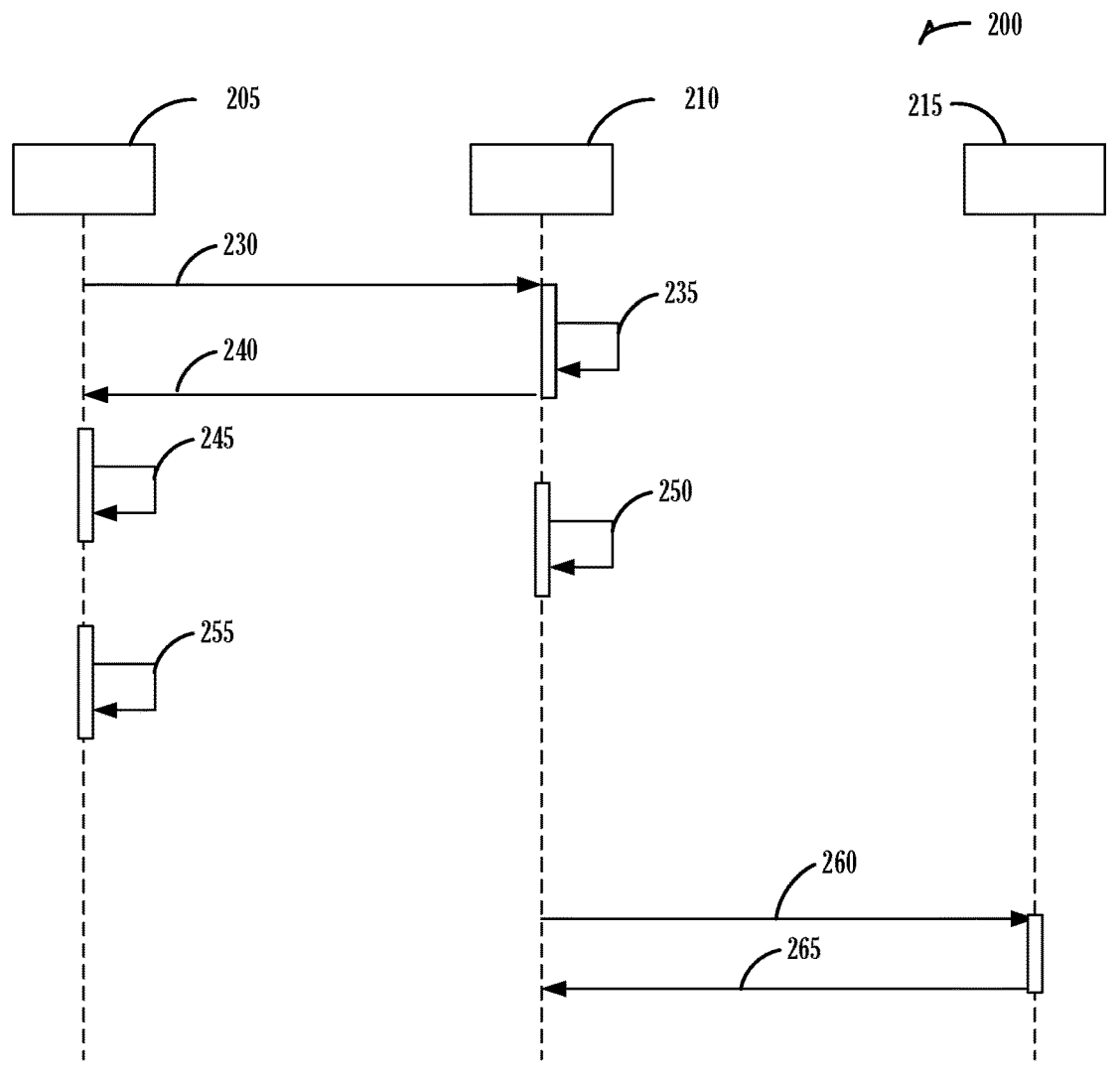
FIG. 2 is an example flowchart of a process for the system of FIG. 1.

FIG. 2 illustrates a process flow diagram of an example of a network 200. The network 200 can include edge devices 205, edge controllers 210, and a centralized cloud server 215. The edge devices 205, the edge controllers 210, and the centralized cloud server 215 can exercise the following operations for trusted lightweight communication in cloud robotics.

At operation 230, the edge devices 205 can use localized blockchain peers to cooperate on the decision-making through the edge cloud platform (e.g., the edge controllers 210) at proximity. For example, the edge devices 205 can coordinate colliding trajectories between mobile robots at an intersection or find consensus between robot arms operating in a shared space to avoid going after objects in the same space.

At operation 235, the edge devices 205 can send a proposed contract to the edge controllers 210 to propagate the proposed contract to peers to build consensus. For example, the edge devices 205 and the edge controllers 210 can reach consensus on a proposed smart contract using practical byzantine fault tolerance (PBFT) or other consensus mechanisms. For example, the proposed smart contract can be accepted and validated by each of the edge devices 205 and the edge controllers 210.

At operation 240, consensus can be confirmed with all devices and at operation 245, each of the edge devices 205 can add an entry on a distributed ledger indicative that consensus was reached by the edge devices 205 and the edge controllers 210. At operation 250, the edge controllers 210 can add the entry to the distributed ledger indicative that consensus was reached by the edge devices 205 and the edge controllers 210. In examples, operation 245 and operation 250 can occur simultaneously.

At operation 255, each of the edge devices 205 can complete their sequence of actions based on the outcome of the smart contract code that the edge devices 205 and the edge controllers 210 reached consensus.

At operation 260, the edge controllers 210 can transmit the local consensus & the distributed ledger to the centralized cloud server 215 for attestation. In an example, the edge controllers 210 can send an entry for an update of the distributed ledger on the centralized cloud server 215. The centralized cloud server 215 can transmit that update to any additional edge controllers connected to the network. The additional edge controllers can then transmit the entry to edge devices connected to the additional edge controllers, respectively.

At operation 265, the centralized cloud server 215 can receive and transmit entries confirming consensuses from the edge devices connected to the additional edge controllers.

FIG. 3 illustrates a flow diagram of an example of a method 300 for trusted lightweight communication in cloud robotics, according to an embodiment. More specific examples of the method 300 are discussed below. The steps or operations of the method 300 are illustrated in a particular order for convenience and clarity; many of the discussed operations can be performed in a different sequence or in parallel without materially impacting other operations. The method 300 as discussed includes operations performed by multiple different actors, devices, or systems. It is understood that subsets of the operations discussed in the method 300 can be attributable to a single actor, device, or system could be considered a separate standalone process or method.

At operation 305, the method 300 can include receiving a first algorithm report from a first device after the first device runs a first algorithm. The method 300 can also include receiving a second algorithm report from a second device after the second device runs the first algorithm. In examples, the first algorithm report and the second algorithm report can be received by an edge controller. In examples, the first algorithm can be stored on a distributed ledger. For example, the first algorithm can be stored on a smart contract on the distributed ledger. In examples, the method 300 can also include transmitting the first algorithm to a second edge controller. For example, the first algorithm can be transmitted to the second edge controller via a cloud server.

In an example, the first device and the second device can be autonomous vehicles. For example, the first device and the second device can be a consumer vehicle, a commercial vehicle, or a robotic system used to transport goods around a region. In examples, the first algorithm can be a path planning algorithm to determine a best route between a first point and a second point. For example, the algorithm can be a path planning algorithm to determine a best route to travel from a first geographic location to a second geographic location. Here, the first algorithm can take a lot of external factors (e.g., weather, traffic, road construction, road closures, traffic signals, events, or the like) to determine a best path between the first geographic location and the second geographic location. In examples, the first device can be a first model of an autonomous vehicle, and the second device can be a different model of an autonomous vehicle.

In examples, the first device and second devices can be manufacturing robots. For example, the first device and the second device can be a welder, coater, sealer, assembler, or the like. Here, the first device and the second device can be completing the same task, or the first device and the second device can be completing complementary tasks. In yet another example, the first device and the second device can be completing tasks completely unrelated to one another. In examples, the first algorithm can be a sequence planning algorithm to determine the best sequence to complete a task. For example, the sequence planning algorithm can verify the path of the first robot and the second robot during the lifecycle of the operations to determine that there is no interference between the operations being carried out by the first robot and the operations being carried out by the second robot. For example, the first device and the second device can avoid collision by running the sequence planning algorithm after consensus.

At operation 310, the method 300 can include determining consensus between the first device and the second device. In examples, consensus can be based on agreement between the first algorithm report and the second algorithm report. Agreement between the first algorithm report and the second algorithm report can come in different forms. For example, agreement can be verification that operations of the first robot will not interfere with operations of the second robot. In another example, an agreement can be verified that the first robot and the second robot determine a path that is the most efficient path between a first geographic location and a second geographic location. In yet another example, the agreement can be that the first device and the second device detect the same hazards or warnings, while running the first algorithm. Thus, the agreement can be specific to the algorithm, but the examples provided above are not intended to be limiting as the algorithms suggested can be for many problems interfaced by autonomous mobile robots.

At operation 315, the method 300 can include adding an entry to the distributed ledger. For example, the entry can be indicative of consensus between the first device and the second device. An entry can be made on a distributed ledger upon consensus of all devices, and or controllers, and verification of a has on the distributed ledger to verify that no modifications or alterations were made to the distributed ledger. The entry adds the consensus to the distributed ledger such that all devices can reference the ledger and know that consensus was reached between the devices.

The method 300 can also include receiving a request to join a network from a third device. For example, the first and second devices can be connected to the network. Upon granting connection to the third device, the edge controller can transmit a copy of the distributed ledger to the third device. The method 300 can also include, transmitting a transaction notifying the third device of the first algorithm stored on the distributed ledger to the third device upon the third device connecting to the network. In examples, the method 300 can also include transmitting instructions to the third device to run the first algorithm.

The method 300 can also include, receiving a third algorithm report from the third device after the third device runs the first algorithm and determining consensus between the first device, the second device, and the third device on agreement between the first algorithm report, the second algorithm report, and the third algorithm report. In examples, the method 300 can also include adding a second entry to the distributed ledger, the second entry indicative of consensus between the first device, the second device, and the third device. Thus, upon adding the second entry on the distributed ledger, the distributed ledger can include the first entry and the second entry. The distributed ledger can also include any previously added smart contracts, algorithms, software packages, transactions between any of the devices with access to the distributed ledger, or the like.

In examples, the method 300 can further include receiving a third entry for the distributed ledger from a cloud server. For example, the third entry can be the second algorithm. Here, the second algorithm can be included in a smart contract, a software package, or the like. The method 300 can also include transmitting a transaction to the first device and the second device to run the second algorithm and receiving a fourth algorithm report from the first device after the first device runs the second algorithm and a fifth algorithm report from the second device after the second device runs the second algorithm. The method 300 can also include determining consensus between the first device and the second device on agreement between the fourth algorithm report and the fifth algorithm report. In an example, the method 300 can also include, adding a fourth entry to the distributed ledger, the fourth entry indicative of consensus between the first device and the second device. As discussed above, the distributed ledger can also include any previously added smart contracts, algorithms, software packages, transactions between any of the devices with access to the distributed ledger, or the like.

The method 300 can also include receiving a sixth algorithm report from a first device after the first device runs the first algorithm and a seventh algorithm report from the second device after the second device runs the first algorithm. The method 300 can also include determining no consensus between the first device and the second device based on a disagreement between the sixth algorithm report and the seventh algorithm report. For example, the disagreement can include a potential collision between the first device and the second device, a mismatch in the warnings or errors while running the algorithms, a different calculated best path between a first location and a second location, or the like. In examples, the method 300 can also include not adding a fifth entry to the distributed ledger because there was no consensus between the first device and the second device.

Figure 4:
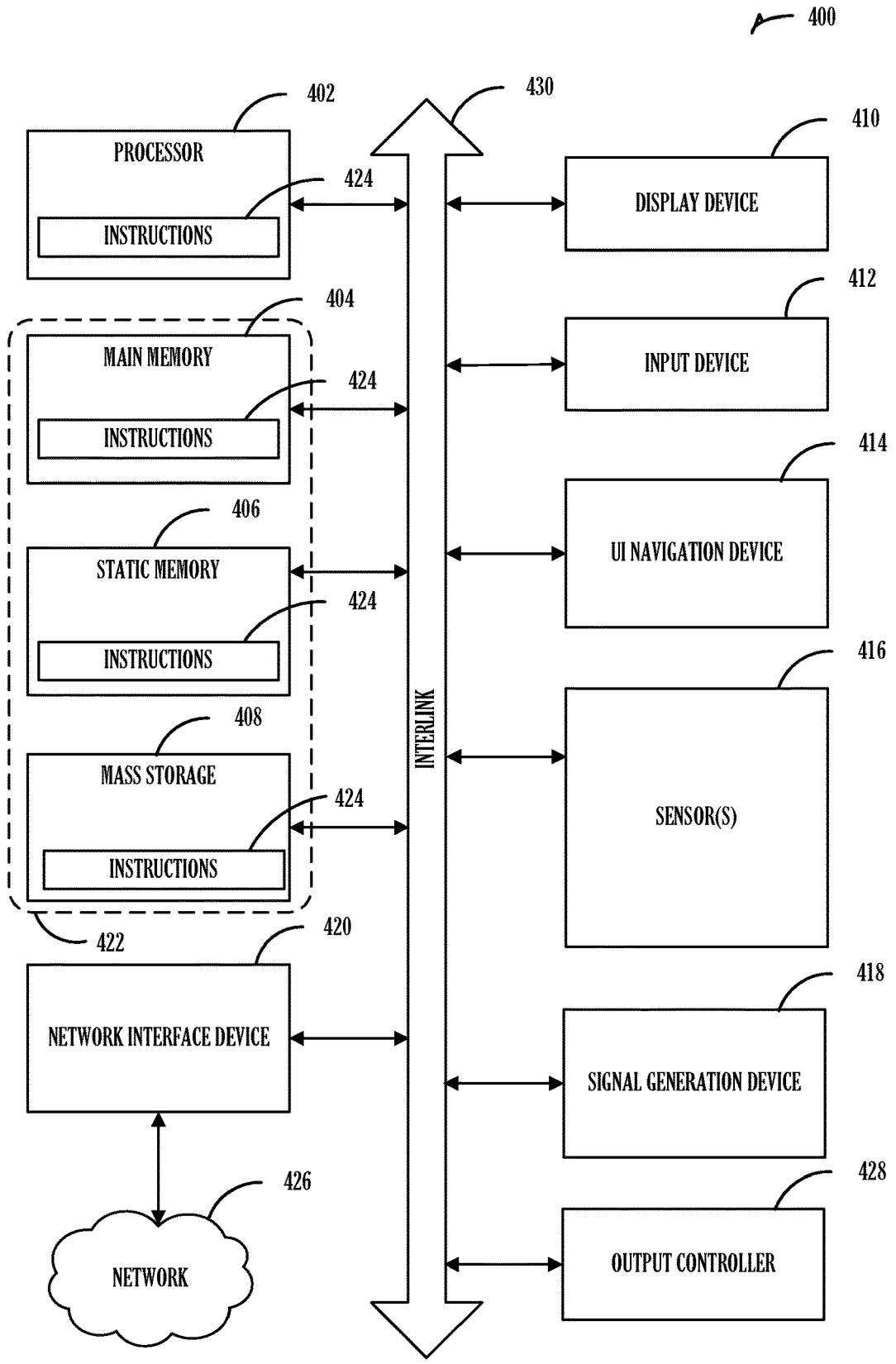
FIG. 4 is a block diagram illustrating an example of a machine upon which one or more embodiments can be implemented.

FIG. 4 illustrates a block diagram illustrating an example of an example of machine 400 upon which any one or more of the techniques (e.g., methodologies) discussed herein can perform. Examples, as described herein, can include, or can operate by, logic or a number of components, or mechanisms in the machine 400. Circuitry (e.g., processing circuitry) is a collection of circuits implemented in tangible entities of the machine 400 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 400 follow.

In alternative embodiments, the machine 400 can operate as a standalone device or can be connected (e.g., networked) to other machines. In a networked deployment, the machine 400 can operate in the capacity of a server machine, a client machine, or both in server-client network environments. In an example, the machine 400 can act as a peer machine in peer-to-peer (P2P) (or other distributed) network environment. The machine 400 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 400 can include a hardware processor 402 (e.g., a central processing unit (CPU), a graphics processing unit (GPU), a hardware processor core, or any combination thereof), a main memory 404, a static memory (e.g., memory or storage for firmware, microcode, a basic-input-output (BIOS), unified extensible firmware interface (UEFI), etc.) 406, and mass storage 408 (e.g., hard drives, tape drives, flash storage, or other block devices) some or all of which can communicate with each other via an interlink (e.g., bus) 430. The machine 400 can further include a display unit 410, an alphanumeric input device 412 (e.g., a keyboard), and a user interface (UI) navigation device 414 (e.g., a mouse). In an example, the display unit 410, input device 412 and UI navigation device 414 can be a touch screen display. The machine 400 can additionally include a storage device (e.g., drive unit) 408, a signal generation device 418 (e.g., a speaker), a network interface device 420, and one or more sensors 416, such as a global positioning system (GPS) sensor, compass, accelerometer, or other sensor. The machine 400 can include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 402, the main memory 404, the static memory 406, or the mass storage 408 can be, or include, a machine readable medium 422 on which is stored one or more sets of data structures or instructions 424 (e.g., software) embodying or utilized by any one or more of the techniques or functions described herein. The instructions 424 can also reside, completely or at least partially, within any of registers of the processor 402, the main memory 404, the static memory 406, or the mass storage 408 during execution thereof by the machine 400. In an example, one or any combination of the hardware processor 402, the main memory 404, the static memory 406, or the mass storage 408 can constitute the machine readable media 422. While the machine readable medium 422 is illustrated as a single medium, the term "machine readable medium" can include a single medium or multiple media (e.g., a centralized or distributed database, and/or associated caches and servers) configured to store the one or more instructions 424.

The term "machine readable medium" can include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine-readable media that do not include transitory propagating signals. Specific examples of non-transitory machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 422 can be representative of the instructions 424, such as instructions 424 themselves or a format from which the instructions 424 can be derived. This format from which the instructions 424 can be derived can include source code, encoded instructions (e.g., in compressed or encrypted form), packaged instructions (e.g., split into multiple packages), or the like. The information representative of the instructions 424 in the machine readable medium 422 can be processed by processing circuitry into the instructions to implement any of the operations discussed herein. For example, deriving the instructions 424 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 424.

In an example, the derivation of the instructions 424 can include assembly, compilation, or interpretation of the information (e.g., by the processing circuitry) to create the instructions 424 from some intermediate or preprocessed format provided by the machine readable medium 422. The information, when provided in multiple parts, can be combined, unpacked, and modified to create the instructions 424. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 424 can be further transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 420 can include one or more physical jacks (e.g., Ethernet, coaxial, or phone jacks) or one or more antennas to connect to the communications network 426. In an example, the network interface device 420 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software. A transmission medium is a machine-readable medium.

ADDITIONAL NOTES & EXAMPLES

Example 1 is a method for trusted lightweight communication in cloud robotics, the method comprising: receiving, with an edge controller, a first report from a first device after the first device runs a first algorithm and a second report from a second device after the second device runs the first algorithm, the first algorithm is stored on a distributed ledger; determining consensus between the first device and the second device based on agreement between the first report and the second report; and adding an entry to the distributed ledger, the entry indicative of consensus between the first device and the second device.

In Example 2, the subject matter of Example 1 includes, receiving a request to join a network from a third device, wherein the first device and the second device are part of the network; and transmitting a transaction notifying the third device of the first algorithm stored on the distributed ledger to the third device upon the third device connecting to the network.

In Example 3, the subject matter of Example 2 includes, transmitting instructions to the third device to run the first algorithm; receiving a third report from the third device after the third device runs the first algorithm; determining consensus between the first device, the second device, and the third device on agreement between the first report, the second report, and the third report; and adding a second entry to the distributed ledger, the second entry indicative of consensus between the first device, the second device, and the third device.

In Example 4, the subject matter of Examples 1-3 includes, transmitting the first algorithm to a second edge controller.

In Example 5, the subject matter of Example 4 includes, wherein the first algorithm is transmitted to the second edge controller via a cloud server.

In Example 6, the subject matter of Examples 1-5 includes, receiving a third entry for the distributed ledger from a cloud server, wherein the third entry is a smart contract including a second algorithm.

In Example 7, the subject matter of Example 6 includes, transmitting a transaction to the first device and the second device to run the second algorithm.

In Example 8, the subject matter of Example 7 includes, receiving a fourth report from the first device after the first device runs the second algorithm and a fifth report from the second device after the second device runs the second algorithm; determining consensus between the first device and the second device on agreement between the fourth report and the fifth report; and adding a fourth entry to the distributed ledger, the fourth entry indicative of consensus between the first device and the second device.

In Example 9, the subject matter of Examples 1-8 includes, receiving a sixth report from a first device after the first device runs the first algorithm and a seventh report from a second device after the second device runs the first algorithm; and determining no consensus between the first device and the second device based on disagreement between the sixth report and the seventh report and not adding a fifth entry to the distributed ledger because there was no consensus between the first device and the second device.

In Example 10, the subject matter of Examples 1-9 includes, wherein the first device and the second device are autonomous vehicles, and wherein the first algorithm is a path planning algorithm to determine a best route between a first point and a second point.

In Example 11, the subject matter of Example 10 includes, wherein the first device is a first model of an autonomous vehicle.

In Example 12, the subject matter of Example 11 includes, wherein the second device is a different model of an autonomous vehicle.

In Example 13, the subject matter of Examples 1-12 includes, wherein the first device and the second device are manufacturing robots, and wherein the first algorithm is a sequence planning algorithm to determine a best sequence to complete a task.

In Example 14, the subject matter of Example 13 includes, wherein the first device and the second device avoid collision by running the sequence planning algorithm after consensus.

In Example 15, the subject matter of Examples 1-14 includes, wherein the first algorithm is stored on a smart contract, and wherein the smart contract is stored on the distributed ledger.

Example 16 is at least one machine readable medium including instructions that, when executed by processing circuitry, cause the processing circuitry to perform any method of Examples 1-15.

Example 17 is a system comprising means to perform any method of Examples 1-15.

Example 18 is a device for trusted lightweight communication in cloud robotics, the device comprising: a memory including instructions; and processing circuitry that, when in operation, is configured by the instructions to: receive a first report from a first device after the first device runs a first algorithm and a second report from a second device after the second device runs the first algorithm with an edge controller, the first algorithm is stored on a distributed ledger; determine consensus between the first device and the second device based on agreement between the first report and the second report; and add an entry to the distributed ledger, the entry indicative of consensus between the first device and the second device.

In Example 19, the subject matter of Example 18 includes, wherein the instructions configured the processing circuitry to: receive a request to join a network from a third device, wherein the first device and the second device are part of the network; and transmit a transaction notifying the third device of the first algorithm stored on the distributed ledger to the third device upon the third device connecting to the network.

In Example 20, the subject matter of Example 19 includes, wherein the instructions configured the processing circuitry to: transmit instructions to the third device to run the first algorithm; receive a third report from the third device after the third device runs the first algorithm; determine consensus between the first device, the second device, and the third device on agreement between the first report, the second report, and the third report; and add a second entry to the distributed ledger, the second entry indicative of consensus between the first device, the second device, and the third device.

In Example 21, the subject matter of Examples 18-20 includes, wherein the instructions configured the processing circuitry to: transmit the first algorithm to a second edge controller.

In Example 22, the subject matter of Example 21 includes, wherein the first algorithm is transmitted to the second edge controller via a cloud server.

In Example 23, the subject matter of Examples 18-22 includes, wherein the instructions configured the processing circuitry to receive a third entry for the distributed ledger from a cloud server, wherein the third entry is a smart contract including a second algorithm.

In Example 24, the subject matter of Example 23 includes, wherein the instructions configured the processing circuitry to transmit a transaction to the first device and the second device to run the second algorithm.

In Example 25, the subject matter of Example 24 includes, wherein the instructions configured the processing circuitry to: receive a fourth report from the first device after the first device runs the second algorithm and a fifth report from the second device after the second device runs the second algorithm; determine consensus between the first device and the second device on agreement between the fourth report and the fifth report; and add a fourth entry to the distributed ledger, the fourth entry indicative of consensus between the first device and the second device.

In Example 26, the subject matter of Examples 18-25 includes, wherein the instructions configured the processing circuitry to: receive a sixth report from a first device after the first device runs the first algorithm and a seventh report from a second device after the second device runs the first algorithm; and determine no consensus between the first device and the second device based on disagreement between the sixth report and the seventh report and not adding a fifth entry to the distributed ledger because there was no consensus between the first device and the second device.

In Example 27, the subject matter of Examples 18-26 includes, wherein the first device and the second device are autonomous vehicles, and wherein the first algorithm is a path planning algorithm to determine a best route between a first point and a second point.

In Example 28, the subject matter of Example 27 includes, wherein the first device is a first model of an autonomous vehicle.

In Example 29, the subject matter of Example 28 includes, wherein the second device is a different model of an autonomous vehicle.

In Example 30, the subject matter of Examples 18-29 includes, wherein the first device and the second device are manufacturing robots, and wherein the first algorithm is a sequence planning algorithm to determine a best sequence to complete a task.

In Example 31, the subject matter of Example 30 includes, wherein the first device and the second device avoid collision by running the sequence planning algorithm after consensus.

In Example 32, the subject matter of Examples 18-31 includes, wherein the first algorithm is stored on a smart contract, and wherein the smart contract is stored on the distributed ledger.

Example 33 is at least one machine readable medium including instructions for lightweight trustworthy communication in cloud robotics, the instructions, when executed by processing circuitry, the instructions, when executed by processing circuitry, cause the processing circuitry to perform the following operations comprising: receiving, with an edge controller, a first report from a first device after the first device runs a first algorithm and a second report from a second device after the second device runs the first algorithm, the first algorithm is stored on a distributed ledger; determining consensus between the first device and the second device based on agreement between the first report and the second report; and adding an entry to the distributed ledger, the entry indicative of consensus between the first device and the second device.

In Example 34, the subject matter of Example 33 includes, wherein the operations comprise: receiving a request to join a network from a third device, wherein the first device and the second device are part of the network; and transmitting a transaction notifying the third device of the first algorithm stored on the distributed ledger to the third device upon the third device connecting to the network.

In Example 35, the subject matter of Example 34 includes, wherein the operations comprise: transmitting instructions to the third device to run the first algorithm; receiving a third report from the third device after the third device runs the first algorithm; determining consensus between the first device, the second device, and the third device on agreement between the first report, the second report, and the third report; and adding a second entry to the distributed ledger, the second entry indicative of consensus between the first device, the second device, and the third device.

In Example 36, the subject matter of Examples 33-35 includes, wherein the operations comprise transmitting the first algorithm to a second edge controller.

In Example 37, the subject matter of Example 36 includes, wherein the first algorithm is transmitted to the second edge controller via a cloud server.

In Example 38, the subject matter of Examples 33-37 includes, wherein the operations comprise receiving a third entry for the distributed ledger from a cloud server, wherein the third entry is a smart contract including a second algorithm.

In Example 39, the subject matter of Example 38 includes, wherein the operations comprise transmitting a transaction to the first device and the second device to run the second algorithm.

In Example 40, the subject matter of Example 39 includes, wherein the operations comprise: receiving a fourth report from the first device after the first device runs the second algorithm and a fifth report from the second device after the second device runs the second algorithm; determining consensus between the first device and the second device on agreement between the fourth report and the fifth report; and adding a fourth entry to the distributed ledger, the fourth entry indicative of consensus between the first device and the second device.

In Example 41, the subject matter of Examples 33-40 includes, wherein the operations comprise: receiving a sixth report from a first device after the first device runs the first algorithm and a seventh report from a second device after the second device runs the first algorithm; and determining no consensus between the first device and the second device based on disagreement between the sixth report and the seventh report and not adding a fifth entry to the distributed ledger because there was no consensus between the first device and the second device.

In Example 42, the subject matter of Examples 33-41 includes, wherein the first device and the second device are autonomous vehicles, and wherein the first algorithm is a path planning algorithm to determine a best route between a first point and a second point.

In Example 43, the subject matter of Example 42 includes, wherein the first device is a first model of an autonomous vehicle.

In Example 44, the subject matter of Example 43 includes, wherein the second device is a different model of an autonomous vehicle.

In Example 45, the subject matter of Examples 33-44 includes, wherein the first device and the second device are manufacturing robots, and wherein the first algorithm is a sequence planning algorithm to determine a best sequence to complete a task.

In Example 46, the subject matter of Example 45 includes, wherein the first device and the second device avoid collision by running the sequence planning algorithm after consensus.

In Example 47, the subject matter of Examples 33-46 includes, wherein the first algorithm is stored on a smart contract, and wherein the smart contract is stored on the distributed ledger.

Example 48 is a system for trusted lightweight communication in cloud robotics, the system comprising: means for receiving, with an edge controller, a first report from a first device after the first device runs a first algorithm and a second report from a second device after the second device runs the first algorithm, the first algorithm is stored on a distributed ledger; means for determining consensus between the first device and the second device based on agreement between the first report and the second report; and means for adding an entry to the distributed ledger, the entry indicative of consensus between the first device and the second device.

In Example 49, the subject matter of Example 48 includes, means for receiving a request to join a network from a third device, wherein the first device and the second device are part of the network; and means for transmitting a transaction notifying the third device of the first algorithm stored on the distributed ledger to the third device upon the third device connecting to the network.

In Example 50, the subject matter of Example 49 includes, means for transmitting instructions to the third device to run the first algorithm; means for receiving a third report from the third device after the third device runs the first algorithm; means for determining consensus between the first device, the second device, and the third device on agreement between the first report, the second report, and the third report; and means for adding a second entry to the distributed ledger, the second entry indicative of consensus between the first device, the second device, and the third device.

In Example 51, the subject matter of Examples 48-50 includes, transmitting the first algorithm to a second edge controller.

In Example 52, the subject matter of Example 51 includes, wherein the first algorithm is transmitted to the second edge controller via a cloud server.

In Example 53, the subject matter of Examples 48-52 includes, receiving a third entry for the distributed ledger from a cloud server, wherein the third entry is a smart contract including a second algorithm.

In Example 54, the subject matter of Example 53 includes, transmitting a transaction to the first device and the second device to run the second algorithm.

In Example 55, the subject matter of Example 54 includes, means for receiving a fourth report from the first device after the first device runs the second algorithm and a fifth report from the second device after the second device runs the second algorithm; means for determining consensus between the first device and the second device on agreement between the fourth report and the fifth report; and means for adding a fourth entry to the distributed ledger, the fourth entry indicative of consensus between the first device and the second device.

In Example 56, the subject matter of Examples 48-55 includes, means for receiving a sixth report from a first device after the first device runs the first algorithm and a seventh report from a second device after the second device runs the first algorithm; and means for determining no consensus between the first device and the second device based on disagreement between the sixth report and the seventh report and not adding a fifth entry to the distributed ledger because there was no consensus between the first device and the second device.

In Example 57, the subject matter of Examples 48-56 includes, wherein the first device and the second device are autonomous vehicles, and wherein the first algorithm is a path planning algorithm to determine a best route between a first point and a second point.

In Example 58, the subject matter of Example 57 includes, wherein the first device is a first model of an autonomous vehicle.

In Example 59, the subject matter of Example 58 includes, wherein the second device is a different model of an autonomous vehicle.

In Example 60, the subject matter of Examples 48-59 includes, wherein the first device and the second device are manufacturing robots, and wherein the first algorithm is a sequence planning algorithm to determine a best sequence to complete a task.

In Example 61, the subject matter of Example 60 includes, wherein the first device and the second device avoid collision by running the sequence planning algorithm after consensus.

In Example 62, the subject matter of Examples 48-61 includes, wherein the first algorithm is stored on a smart contract, and wherein the smart contract is stored on the distributed ledger.

Example 63 is at least one machine-readable medium including instructions that, when executed by processing circuitry, cause the processing circuitry to perform operations to implement of any of Examples 1-62.

Example 64 is an apparatus comprising means to implement of any of Examples 1-62.

Example 65 is a system to implement of any of Examples 1-62.

Example 66 is a method to implement of any of Examples 1-62.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third,"

etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device for trusted lightweight communication in cloud robotics, the device comprising:
a memory including instructions; and
processing circuitry that, when in operation, is configured by the instructions to:
receive a first report from a first device after the first device runs a first algorithm from a distributed ledger and a second report from a second device after the second device runs the first algorithm with an edge controller;
determine consensus between the first device and the second device based on agreement between the first report and the second report; and
add an entry to the distributed ledger, the entry indicative of consensus between the first device and the second device.

2. The device of claim 1, wherein the instructions configured the processing circuitry to:
receive a request to join a network from a third device, wherein the network comprises the first device and the second device; and
transmit a transaction notifying the third device of the first algorithm from the distributed ledger to the third device upon the third device connecting to the network.

3. The device of claim 2, wherein the instructions configured the processing circuitry to:
transmit instructions to the third device to run the first algorithm;
receive a third report from the third device after the third device runs the first algorithm;
determine consensus between the first device, the second device, and the third device on agreement between the first report, the second report, and the third report; and
add a second entry to the distributed ledger, the second entry indicative of consensus between the first device, the second device, and the third device.

4. The device of claim 1, wherein the instructions configured the processing circuitry to receive a third entry for the distributed ledger from a cloud server, wherein the third entry is a smart contract including a second algorithm.

5. The device of claim 4, wherein the instructions configured the processing circuitry to transmit a transaction to the first device and the second device to run the second algorithm.

6. The device of claim 5, wherein the instructions configured the processing circuitry to:
receive a fourth report from the first device after the first device runs the second algorithm and a fifth report from the second device after the second device runs the second algorithm;
determine consensus between the first device and the second device on agreement between the fourth report and the fifth report; and
add a fourth entry to the distributed ledger, the fourth entry indicative of consensus between the first device and the second device.

7. The device of claim 1, wherein the first device and the second device are autonomous vehicles, and wherein the first algorithm is a path planning algorithm to determine a best route between a first location and a second location.

8. The device of claim 1, wherein the first device and the second device are manufacturing robots, and wherein the first algorithm is a sequence planning algorithm to determine a sequence to complete a task.

9. The device of claim 8, wherein the first device and the second device avoid collision by running the sequence planning algorithm after a consensus.

10. At least one non-transient machine readable medium including instructions for lightweight trustworthy communication in cloud robotics, the instructions, when executed by processing circuitry, cause the processing circuitry to perform the following operations comprising:
receiving, with an edge controller, a first report from a first device after the first device runs a first algorithm stored on a distributed ledger and a second report from a second device after the second device runs the first algorithm;
determining consensus between the first device and the second device based on agreement between the first report and the second report; and
adding an entry to the distributed ledger, the entry indicative of consensus between the first device and the second device.

11. The at least one non-transient machine readable medium of claim 10, wherein the operations comprise:
receiving a request to join a network from a third device, wherein the network comprises the first device and the second device; and
transmitting a transaction notifying the third device of the first algorithm from the distributed ledger to the third device upon the third device connecting to the network.

12. The at least one non-transient machine readable medium of claim 11, wherein the operations comprise:
transmitting instructions to the third device to run the first algorithm;
receiving a third report from the third device after the third device runs the first algorithm;
determining consensus between the first device, the second device, and the third device on agreement between the first report, the second report, and the third report; and
adding a second entry to the distributed ledger, the second entry indicative of consensus between the first device, the second device, and the third device.

13. The at least one non-transient machine readable medium of claim 10, wherein the operations comprise receiving a third entry for the distributed ledger from a cloud server, wherein the third entry is a smart contract including a second algorithm.

14. The at least one non-transient machine readable medium of claim 13, wherein the operations comprise transmitting a transaction to the first device and the second device to run the second algorithm.

15. The at least one non-transient machine readable medium of claim 14, wherein the operations comprise:

receiving a fourth report from the first device after the first device runs the second algorithm and a fifth report from the second device after the second device runs the second algorithm;

determining consensus between the first device and the second device on agreement between the fourth report and the fifth report; and adding a fourth entry to the distributed ledger, the fourth entry indicative of consensus between the first device and the second device.

16. The at least one non-transient machine readable medium of claim 10, wherein the first device and the second device are autonomous vehicles, and wherein the first algorithm is a path planning algorithm to determine a best route between a first location and a second location.

17. The at least one non-transient machine readable medium of claim 10, wherein the first device and the second device are manufacturing robots, and wherein the first algorithm is a sequence planning algorithm to determine a sequence to complete a task.

18. The at least one non-transient machine readable medium of claim 17, wherein the first device and the second device avoid collision by running the sequence planning algorithm after consensus.

19. A system for trusted lightweight communication in cloud robotics, the system comprising:

means for receiving, with an edge controller, a first report from a first device after the first device runs a first algorithm and a second report from a second device after the second device runs the first algorithm, the first algorithm is stored on a distributed ledger;

means for determining consensus between the first device and the second device based on agreement between the first report and the second report; and means for adding an entry to the distributed ledger, the entry indicative of consensus between the first device and the second device.

20. The system of claim 19, further comprising:

means for receiving a request to join a network from a third device, wherein the first device and the second device are part of the network; and means for transmitting a transaction notifying the third device of the first algorithm stored on the distributed ledger to the third device upon the third device connecting to the network.

21. The system of claim 20, further comprising:

means for transmitting instructions to the third device to run the first algorithm;

means for receiving a third report from the third device after the third device runs the first algorithm;

means for determining consensus between the first device, the second device, and the third device on agreement between the first report, the second report, and the third report; and means for adding a second entry to the distributed ledger, the second entry indicative of consensus between the first device, the second device, and the third device.

* * * * *